United States Patent Office 2,897,220
Patented July 28, 1959

2,897,220

PREPARATION OF TRIORGANOSILANES

Herbert Jenkner, Hannover-Wulfel, Germany, assignor to Kali-Chemie Aktiengesellschaft, Hannover, Germany No Drawing. Application May 28, 1956
Serial No. 587,465

Claims priority, application Germany May 28, 1955

18 Claims. (Cl. 260—448)

The invention relates to triorganosilanes.

Triorganosilanes ($R_3SiH$) have been made by the action of zinc alkyls or Grignard reagents on trichlorosilane ($SiHCl_3$), or by means of alkyl halides and sodium. They have also been prepared by the reduction of triorganochlorosilanes ($SiR_3Cl$, $SiR_3Br$, $SiR_3I$) with lithium aluminum hydride ($LiAlH_4$).

A principal object of the invention is to provide a novel and convenient method for the preparation of triorganosilanes.

Other objects and advantages will be apparent from a consideration of the specification and claims.

It have found that triorganosilanes are formed by reacting hexaorganodisiloxanes ($R_6Si_2O$) with alkyl aluminum compounds. The reaction may be illustrated by the following equations, wherein R is alkyl, aryl, or aralkyl:

(1) $Al(C_nH_{2n+1})_3 + R_3SiOSiR_3 \rightarrow$
$R_3SiH + R_3SiOAl(C_nH_{2n+1})_2 + C_nH_{2n}$ or (2) $Al(C_nH_{2n+1})_3 + 3R_6Si_2O \rightarrow$
$3R_3SiH + Al(OSiR_3)_3 + 3C_nH_{2n}$ The alkyl aluminum trialkyl silanolates obtained according to Equation 1 are novel compounds, which have not yet been described. Both said alkyl aluminum trialkyl silanolates, and the aluminum trialkyl silanolates obtained according to Equation 2, are readily hydrolyzed according to Equations 3–5:

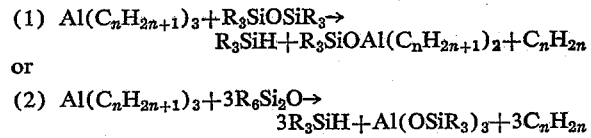

(3) $2Al(OSiR_3)_3 + 6H_2O \rightarrow 2Al(OH)_3 + 6R_3SiOH$
(4) $6R_3SiOH \rightarrow 3R_6Si_2O + 3H_2O$
(5) $2Al(OSiR_3)_3 + 3H_2O \rightarrow 2Al(OH)_3 + 3R_6Si_2O$ As will be seen on viewing the Equations 2 to 5, the reaction of 1 mole of aluminum triethyl with 3 moles of hexaorganosiloxane yields 3 moles of triorganosilane, whereby 1.5 moles of hexaorganodisiloxane are generated again during the reaction. Said re-formed 1.5 moles of hexaorganodisiloxane may be again reacted with 0.5 mole of $AlR_3$ to 1.5 moles of $R_3SiH$ and .75 mole of hexaorganodisiloxane, and so on.

It is, of course, also possible to collect the hexaorganodisiloxane regenerated according to Equations 2 or 1, and 3, 4, and 5, and to react it again with the corresponding amount of the aluminum organo compound.

In either case, a substantially quantitative conversion of hexaorganodisiloxane to triorganosilane is accomplished, as illustrated by the following Equations 6 and 7, which constitute a consolidation of Equations 2 and 5:

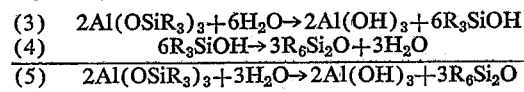

(6) $2Al(C_nH_{2n+1})_3 + 6R_6Si_2O + 3H_2O \rightarrow$
$2Al(OH)_3 + 3R_6Si_2O + 6R_3SiH + 6C_nH_{2n}$ or (7) $2Al(C_nH_{2n+1})_3 + 3R_6Si_2O + 3H_2O \rightarrow$
$2Al(OH)_3 + 6R_3SiH + 6C_nH_{2n}$ Equation 7 illustrates the theoretical reaction which however, as stated above, cannot be accomplished in a single step.

A further simplification of the procedure can be obtained by incorporating the formation of aluminum trialkyls from aluminum, hydrogen and olefines according to the equation (8) $2Al + 3H_2 + 6C_nH_{2n} \rightarrow 2Al(C_nH_{2n+1})_3$ For this reaction, the olefines formed according to Reactions 1, 2, 6 and 7 are recycled; consolidation of Equations 7 and 8 results in equations (9) $2Al + 3H_2 + 6C_nH_{2n} + 3R_6Si_2O + 3H_2O \rightarrow$
$6R_3SiH + 2Al(OH)_3 + 6C_nH_{2n}$ and

(10) $2Al + 3H_2 + 3R_6Si_2O + 3H_2O \rightarrow 6R_3SiH + 2Al(OH)_3$ showing that a hydrogenation of hexaorganodisiloxanes to triorganosilanes can be obtained with consumption of aluminum and hydrogen.

On investigating the mechanism of the reaction between alkyl aluminum compounds and hexaorganosiloxanes, it was found that an intermediate formation of alkyl aluminum hydrides takes place, which at once react further with formation of triorganosilanes. Therefore, it is also possible to react hexaorganodisiloxanes directly with alkyl aluminum hydrides in order to obtain the desired triorganosilanes.

The reaction between hexaorganodisiloxanes and alkyl aluminum compounds may be carried out at elevated temperatures up to about 300° C. without solvents and catalysts; when an aluminum trialkyl is used, the temperature should be about 100° to 300° C., preferably 100° to 250° C., and the reaction with an aluminum hydride is carried out at a temperature of about 10° to 200° C. Catalysts may be added to facilitate the decomposition of the organo-aluminum compound; suitable catalysts are, for instance, colloidal nickel, cobalt, and the like. It may also sometimes be of advantage to apply pressure, particularly when hexamethyldisiloxane or tetramethyldiethylsiloxane are used as reactants.

The triorganosilanes obtained according to the method of the invention are useful in the preparation of organopolysiloxanes as propellants, and generally as hydrogenating and reducing agents for inorganic and organic compounds.

The following examples are given to illustrate various embodiments of the invention, it being understood that they are not intended to limit the invention in any way.

All parts are given by weight unless indicated otherwise.

Example 1

524 parts of hexaethyldisiloxane were mixed with 275 parts of aluminum triethyl (under nitrogen) and heated for 9 hours at 190–200° C. with stirring.

According to the equation

(11) $(C_2H_5)_6Si_2O + Al(C_2H_5)_3 \rightarrow$
$(C_2H_5)_3SiH + (C_2H_5)_3SiOAl(C_2H_5)_2 + C_2H_4$ 232 parts of triethylsilane ($B_{.760} = 107°$ C.) were obtained, corresponding to a yield of more than 90 percent, calculated on hexadiethyldisiloxane. Instead of ethylene, which could be obtained in an amount of only 10 percent of the theoretical amount, high molecular olefines were found. The diethyl aluminum triethyl silanolate obtained as by-product is a compound unknown heretofore; it is an almost colorless liquid having a boiling point of 192–198° C. at 16 mm. Hg. The hydrolysis of the compound yielded ethane in an amount of 95 percent of the theory; the Al content was 12.5 percent, which corresponds to the theoretical amount.

Example 2

60 parts of aluminum triethyl were slowly added to 80 parts of hexamethyldisiloxane, and the mixture was refluxed for 4 hours. The yield of trimethylsilane was only 5 percent. When the mixture was then heated for 4 more hours at 200 to 215° C. in a V4A autoclave of 200 cc. capacity, 25 parts of trimethylsilane were obtained, which corresponded to a yield of 71.5 percent of the theory. Only 5 percent of the obtained olefines consisted of ethylene; the remainder was again a mixture of higher polymerized olefines. After removal of the unreacted aluminum triethyl, a mixture of compounds $(C_2H_5)_2AlOSi(CH_3)_3$ and $C_2H_5Al[OSi(CH_3)_3]_2$ was distilled off at a reduced pressure of 18 mm. Hg and a temperature of 136–142° C., which mixture solidified incompletely at room temperature. The "ethyl aluminum sesquitrimethylsilanolate" contained 13 percent of Al. The theoretical Al content would be 13.2 percent. On hydrolysis, 110 percent of the theoretical ethane amount was obtained, which shows that a major component of the mixture was the compound $(C_2H_5)_2AlOSi(CH_3)_3$.

By reaction with bromine at −78° C., the obtained trimethylsilane could be quantitatively converted to trimethyl bromosilane ($B_{.760}$=80 to 81° C.).

The hydrolyzate was acidified with sulphuric acid, whereby the regenerated hexamethyldisiloxane (33 parts) could be employed for a new batch.

*Example 3*

Hexamethyldisiloxane and aluminum triethyl were mixed in a mole ratio of 1:1 and heated in an autoclave at 230 to 240° C. for 9 hours. The yield of trimethyl silane was 93 percent of the theory.

*Example 4*

31 parts of diisobutylaluminumhydride were added dropwise with stirring at 80 to 100° C. to 31 parts of hexamethyldisiloxane. The yield was 13 parts of trimethylsilane, corresponding to 81 percent of the theory. In addition, 49 parts of a colorless crystalline mass were obtained, which consisted essentially of diisobutyl aluminum trimethyl silanolate, which distills at 1.5 mm. Hg between 165 and 175° C.

I claim:

1. A method for the preparation of trialkylsilanes comprising reacting hexaalkyldisiloxanes with an alkyl aluminum compound of the formula $R'_mAlH_{3-m}$, wherein $R'$ is alkyl and $m$ is a positive integer of less than 4, at a temperature of about 100° to 300° C. when said $m$ is 3, and at a temperature of about 10° to 200° C. when said $m$ is a positive integer of less than 3.

2. The method of claim 1, wherein the reaction is carried out at a pressure of about 1 to 160 atm.

3. The method of claim 1, wherein the reaction is carried out in the presence of a catalyst increasing the decomposition rate of the alkyl aluminum compound.

4. A method for the preparation of trialkyl silanes comprising reacting a hexaalkyldisiloxane of the formula $R_6Si_2O$, R being alkyl, with an alkyl aluminum compound of the formula $R^1_mAlH_n$, wherein $R^1$ is alkyl, $m$ is a positive integer of less than 4, and $n$ is an integer from 0 to 2, $m+n$ being 3, at a temperature of about 100° to 300° C. when said $m$ is 3, and at a temperature of about 10° to 200° C. when said $m$ is a positive integer of less than 3, thereby forming a trialkyl silane $R_3SiH$ and an aluminum alkyl silanolate, removing said trialkyl silane, hydrolyzing said aluminum alkyl silanolate, thereby regenerating said hexaalkyldisiloxane, and reacting said regenerated hexaalkyldisiloxane again with said alkyl aluminum compound.

5. A method for the preparation of trimethylsilane comprising reacting hexamethyldisiloxane with trialkyl aluminum at a temperature of about 100° to 250° C.

6. A method for the preparation of trimethylsilane comprising reacting hexamethyldisiloxane with an alkyl aluminum hydride at a temperature of about 10° to 200° C.

7. A method for the preparation of triethylsilane comprising reacting hexaethyldisiloxane with trialkyl aluminum at a temperature of about 100° to 250° C.

8. A method for the preparation of triethylsilane comprising reacting hexaethyldisiloxane with an alkyl aluminum hydride at a temperature of about 10° to 200° C.

9. Compounds of the general formula $R_3SiOAlR^1_2$, R and $R^1$ being alkyl.

10. Compounds of the general formula $Al(OSiR_3)_3$ wherein R is alkyl.

11. Composition consisting of a mixture of the compounds $R_3SiOAlR'_2$ and $Al(OSiR_3)_3$, R and R' being alkyl.

12. A method for the preparation of triethylsilane, comprising reacting hexaethyldisiloxane with triethyl aluminum at a temperature of about 100° to 250° C.

13. A method for the preparation of trimethylsilane, comprising reacting hexamethyldisiloxane with triethyl aluminum at a temperature of about 100° to 250° C.

14. A method for the preparation of trimethylsilane, comprising reacting hexamethyldisiloxane with diisobutylaluminumhydride at a temperature of about 10° to 200° C.

15. Compounds of the formula $R_aAl(OSiR^1_3)_{3-a}$ wherein R and $R^1$ are alkyl and $a$ is a positive integer of less than 3, said compounds developing the alkane $R_aH$ on hydrolysis.

16. Ethylaluminum sesquitrialkylsilanolate of the formula $(C_2H_5)_2AlOSi(R^1)_3$, wherein $R^1$ is a member of the group consisting of methyl and ethyl.

17. Diethylaluminumtrialkylsilanolate of the formula $C_2H_5Al(OSiR^1_3)_2$, wherein $R^1$ is a member of the group consisting of methyl and ethyl.

18. The method of claim 1, wherein the reaction is carried out in the presence of a colloidal metal catalyst selected from the group consisting of cobalt and nickel.

No references cited.